(12) United States Patent
Laxman et al.

(10) Patent No.: US 12,257,968 B2
(45) Date of Patent: Mar. 25, 2025

(54) FRONT UNDERRUN PROTECTION DEVICE FOR A HEAVY VEHICLE

(71) Applicant: Volvo Truck Corporation, Gothenburg (SE)

(72) Inventors: Gowtham Kannakaje Laxman, Puttur Karnataka (IN); Madhuchandra Koogenahalli Sadashivaiah, Bangalore Karnataka (IN); Sudhindra Keralapura Seetharamaiah, Bangalore Karnataka (IN); Bharath Channappa, Bangalore Karnataka (IN); Vinay Lohith, Mysore Karnataka (IN)

(73) Assignee: Volvo Truck Corporation, Gothenburg (SE)

( * ) Notice: Subject to any disclaimer, the term of this patent is extended or adjusted under 35 U.S.C. 154(b) by 414 days.

(21) Appl. No.: 17/626,539

(22) PCT Filed: Jun. 16, 2020

(86) PCT No.: PCT/EP2020/066621
§ 371 (c)(1),
(2) Date: Jan. 12, 2022

(87) PCT Pub. No.: WO2021/013435
PCT Pub. Date: Jan. 28, 2021

(65) Prior Publication Data
US 2022/0324401 A1    Oct. 13, 2022

(30) Foreign Application Priority Data

Jul. 19, 2019    (IN) .............................. 201941029125

(51) Int. Cl.
*B60R 19/00*    (2006.01)
*B60R 19/18*    (2006.01)
*B60R 19/56*    (2006.01)

(52) U.S. Cl.
CPC .............. *B60R 19/56* (2013.01); *B60R 19/18* (2013.01)

(58) Field of Classification Search
CPC .. B60R 19/56; B60R 19/18; B60R 2019/1833
(Continued)

(56) References Cited

U.S. PATENT DOCUMENTS 3,888,531 A * 6/1975 Straza ...................... F16F 7/121
                                                                  428/116
4,221,413 A * 9/1980 Bonnetain ............... B60R 19/18
                                                                  293/122

(Continued)

FOREIGN PATENT DOCUMENTS

CN    101274610 A    10/2008
CN    106068210 A    11/2016

(Continued)

OTHER PUBLICATIONS

WO-2015128832-A2 computer translation (Year: 2015).*

(Continued)

*Primary Examiner* — Steven O Douglas
(74) *Attorney, Agent, or Firm* — Withrow & Terranova, PLLC (57) ABSTRACT

The invention relates to a front underrun protection device for a heavy vehicle comprising a beam configured to extend from side to side of the vehicle at a lower front position thereof and to absorb collision energy. The beam is at least partly made of a plastic or polymeric material. The beam comprises a housing beam member having at least one channel extending along the housing beam member, and at least one reinforcement beam member adapted to fit into the channel of the housing beam member. The reinforcement beam member is arranged in the channel and arranged to extend along the housing beam member. The reinforcement (Continued)

beam member is provided with a plurality of wall elements comprising transversal wall elements distributed along and extending across the reinforcement beam member and longitudinal wall elements extending in a longitudinal direction of the reinforcement beam member between the transversal wall elements.

19 Claims, 6 Drawing Sheets

(58) Field of Classification Search
USPC .......................... 293/38, 102, 120, 142, 123
See application file for complete search history.

(56) References Cited

U.S. PATENT DOCUMENTS

| | | | | |
|---|---|---|---|---|
| 6,286,879 | B1 * | 9/2001 | Haque | ..................... B60R 19/03 293/120 |
| 2012/0112479 | A1 | 5/2012 | Nagwanshi et al. | |
| 2015/0367798 | A1 * | 12/2015 | Bobba | ..................... B60R 19/56 293/120 |
| 2016/0311467 | A1 | 10/2016 | Johnston | |

FOREIGN PATENT DOCUMENTS

| | | | | |
|---|---|---|---|---|
| DE | 102006008088 | A1 | | 8/2007 |
| EP | 2719565 | A1 | | 4/2014 |
| GB | 2469013 | A | | 9/2010 |
| JP | 2003072493 | A | * | 3/2003 |
| JP | 2009262678 | A | | 11/2009 |
| JP | 2013203129 | A | | 10/2013 |
| WO | 2013002010 | A1 | | 1/2013 |
| WO | WO-2015128832 | A2 | * | 9/2015 ............ B60R 19/56 |
| WO | 19042554 | A1 | | 3/2019 |

OTHER PUBLICATIONS

JP-2003072493-A computer translation (Year: 2003).*
International Search Report and Written Opinion for International Patent Application No. PCT/EP2020/066621, mailed Jul. 28, 2020, 14 pages.
Intention to Grant for European Patent Application No. 20734850.9, mailed Oct. 12, 2023, 32 pages.
First Office Action for Chinese Patent Application No. 202080051234.2, mailed Jan. 22, 2024, 17 pages.

* cited by examiner

FRONT UNDERRUN PROTECTION DEVICE FOR A HEAVY VEHICLE

This application is a 35 USC 371 national phase filing of International Application No. PCT/EP2020/066621, filed Jun. 16, 2020, which in turn claims priority to Indian Patent Application number 201941029125, filed Jul. 19, 2019, the disclosures of which are incorporated herein by reference in their entireties.

TECHNICAL FIELD

The invention relates to a front underrun protection device for a heavy vehicle. The invention can be applied in heavy-duty vehicles, such as trucks, buses and construction equipment. Although the invention will be described with respect to a truck the invention is not restricted to this particular vehicle.

BACKGROUND

Trucks and other heavy vehicles are commonly provided with a front underrun protection device comprising a beam and brackets for arrangement at a lower front of the vehicle for the purpose of absorbing collision energy and preventing a smaller vehicle from wedging under the larger vehicle in a collision. Regulations govern the impact performance for front underrun protection devices, i.e. strength, load absorption, deformation, etc. At the same time it is of interest to make such devices as light as possible to reduce weight and thereby reduce fuel consumption for the vehicle.

US2015/0367798 discloses an underrun protection device based on polymeric material that is said to be lighter than conventional underrun protection devices made of steel. However, the device of US2015/0367798 contains considerable amounts of steel to meet the regulations and there is thus still room for improvements in this field.

SUMMARY

An object of the invention is to provide a front underrun protection device comprising a beam where at least the beam can be made entirely of a plastic or polymeric material and thereby be lighter than known devices of this type. This object is achieved by a device according to claim 1.

The invention relates to a front underrun protection device for a heavy vehicle such as a truck, wherein the device comprises a beam configured to, when the device is arranged onto the vehicle, extend from side to side of the vehicle at a lower front position thereof and to absorb collision energy in case of e.g. a front collision between the vehicle and a passenger car, and wherein the beam is at least partly made of a plastic or polymeric material.

The beam comprises: a housing beam member extending in a longitudinal direction of the beam and having at least one channel extending along the housing beam member and at least one reinforcement beam member having an outer shape adapted to fit into the channel of the housing beam member, wherein the reinforcement beam member is arranged in the channel and arranged to extend along the housing beam member, and wherein the reinforcement beam member is provided with a plurality of wall elements comprising transversal wall elements distributed along and extending across the reinforcement beam member and longitudinal wall elements extending in a longitudinal direction of the reinforcement beam member between the transversal wall elements.

Wall elements, i.e. flat ribs, arranged in this way are capable of absorbing a sufficient portion of the load in a crash situation and a housing beam member arranged in this way is capable of providing a sufficient support. The beam proposed can therefore be produced entirely in a plastic or polymeric material but still conform to the strength and load absorbing requirements set for front underrun protection devices. Since the wall elements also give rise to a structure with lots of voids, a front underrun protection device according to the invention can attain a very low weight. Arranging the wall elements in two separate reinforcement beam members, instead of in one larger reinforcement beam member, can be used to simplify manufacturing of the individual reinforcement beam members and also makes it possible to make use of relatively thin (and thereby light) wall elements that are not too weak because being too large in relation to their thickness. A reinforcement beam member adapted to fit into a channel of the housing beam member can be firmly fixed to the housing beam member using adhesives, which forms a robust and light integral beam structure.

In an embodiment the housing beam member has a cross-section comprising a substantially U-shaped part with first and second substantially parallel outer panels connected by an inner panel that extends between the first and second outer panels in a plane substantially perpendicular to that of the outer panels so as to form the channel extending along the housing beam member at one side of the inner panel between the substantially parallel outer panels. That the shape of the part of the cross-section is substantially U-shaped means that it can have various U-like shapes, such as a rectangular shape with orthogonal angels between outer panels and inner panel, and the outer panels may have different lengths, etc. Further, the U-shaped part of the cross-section may be a part of a total cross-section that has a general shape that is not U-shaped, such as a H-shape, D-shape or C-shape.

In an embodiment the housing member has a substantially H-shaped cross-section with the first and second substantially parallel outer panels connected by the inner panel that extends between the first and second outer panels in a plane substantially perpendicular to that of the outer panels so as to form first and second channels extending between the outer panels along the housing beam member at opposite sides of the inner panel. This way first and second reinforcement beam members can be placed on opposite sides of the inner panel. Also the H-shape can be varied, for instance, the two outer panels may have different lengths.

The beam is preferably intended to be arranged onto the vehicle oriented in such a way that the U- or H-shaped cross section of the housing beam member remains, i.e. the outer panels of the housing beam member are intended to extend vertically while the connecting inner panel is oriented horizontally.

In an embodiment the beam comprises first and second reinforcement beam members, each having an outer shape adapted to fit into the first and second channel, respectively, of the housing beam member, wherein each of the first and second reinforcement beam members is arranged in its corresponding channel and arranged to extend along the housing beam member, and wherein each of the first and second reinforcement beam members is provided with said plurality of wall elements.

In an embodiment the transversal wall elements comprise at least a first type of transversal wall elements that extend in a plane of the beam that is perpendicular or mainly perpendicular to the inner panel of the housing beam member. Besides extending across the reinforcement beam member, the first type of transversal wall elements will thus extend more or less vertically with the flat sides facing sideways when the beam is arranged onto the vehicle. That the first type of transversal wall elements may be "mainly" perpendicular to the inner panel of the housing beam member means that these wall elements might be inclined in relation to the inner panel. This is further described below.

In an embodiment the longitudinal wall elements extend in a plane of the beam that is substantially perpendicular to the inner panel of the housing beam member. Besides extending in a longitudinal direction of the reinforcement beam member, the longitudinal wall elements thus extend vertically or close to vertically with the flat sides facing forward and backwards when the beam is arranged onto the vehicle.

In an embodiment each reinforcement beam member comprises at least a first, a second and a third transversal wall element of the first type, wherein the first and third transversal wall elements are arranged on opposite sides of the second transversal wall element in the longitudinal direction of the beam, wherein one or more longitudinal wall elements extend between the first and the second transversal wall elements, wherein one or more further longitudinal wall elements extend between the second and the third transversal wall elements, and wherein the one or more longitudinal wall elements that extend between the first and the second transversal wall elements are arranged transversally offset in relation to the one or more further longitudinal wall elements that extend between the second and the third transversal wall elements.

In other words, in one section of the reinforcement beam member between two transversal wall elements of the first type, one or more longitudinal wall elements are displaced transversally in relation to an adjacent section of the reinforcement beam member so that the longitudinal wall elements in one section are not aligned with the longitudinal wall elements of an adjacent section on another side of a delimiting transversal wall element. This offset arrangement of the longitudinal wall elements, which thus leads to varying cross section of the reinforcement beam member, enhances the load absorbing capacity.

Preferably, the entire reinforcement beam member, or at least a major part thereof, is made up of a plurality of sections where the longitudinal wall elements of adjacent sections are offset in relation to each other. For instance, each reinforcement beam member may comprise two types of sections, a first type with two longitudinal wall elements (besides the outer walls of the reinforcement beam member) and a second type with three longitudinal wall elements positioned transversally offset in relation to the two wall elements of the first section type. By alternating the order of the section types, first-second-first-second etc., the longitudinal wall elements of adjacent sections will be arranged offset in relation to each other. More than two types of sections can be used, and a certain section may contain one or more than three longitudinal wall elements. The length of one section (in the longitudinal direction of the beam) may be around 30-40 mm, and the beam may include in total around 60 sections of such length so as to add up to a total length of, for instance, 2200 mm.

In an embodiment the longitudinal distance between the first and the second transversal wall element forms a first type of section, wherein the longitudinal distance between the second and the third transversal wall element forms a second type of section, wherein each reinforcement beam member in the longitudinal direction thereof comprises a repetitive pattern of sections where a plurality of first and second sections are arranged adjacent each other in alternating order.

In an embodiment at least a portion of the transversal wall elements of the first type are inclined in relation to the inner panel of the housing beam member. Thus, although these wall elements still extend roughly vertically when the beam is arranged onto the vehicle, they are slightly inclined in relation to the vertical direction. This inclination increases the projected area for the applied load since an inclined transversal wall element of the first type extends over some distance in the longitudinal direction of the beam, i.e. over a distance that is longer than the wall thickness of the transversal wall element. An effect of the inclination is thus an increased resistance to crushing.

In an embodiment adjacent inclined transversal wall elements are inclined in different directions so that a certain pair of adjacent wall elements are inclined either towards each other or away from each other. Thus, adjacent wall elements are inclined either towards each other, such as ∧, or away from each other, such as ∨, but not in the same direction so as to be more or less parallel, such as //. This simplifies manufacturing of the reinforcement beam member since the inclination in different directions generates wedge-like openings with the wider end facing outwards (i.e. upwards or downwards) allowing a production tool to be removed during production (in contrast to inclined and parallel wall elements that do not provide such production-friendly openings).

In an embodiment the transversal wall elements comprise a second type of transversal wall elements that extend in a plane of the beam that is substantially parallel with the inner panel of the housing beam member. Besides extending across the reinforcement beam member, the second type of transversal wall elements will thus extend substantially horizontally with the flat sides facing upwards and downwards when the beam is arranged onto the vehicle. Transversal wall elements arranged also in this direction add to the strength and rigidity of the beam as a whole.

In an embodiment the transversal wall elements of the second type are arranged to connect end portions or edges of pairs of adjacent and inclined transversal wall elements of the first type. This connection stabilizes the beam and the second type of transversal wall elements also provides a suitable surface for adhesive-joining of the reinforcement beam member onto the inner panel of the housing beam member.

In an embodiment, and for a certain pair of adjacent and inclined transversal wall elements of the first type where the distance between the edges of the two wall elements in the pair is (because of the inclination) less on one side of the reinforcement beam member than on the opposite side, the corresponding transversal wall element of the second type is arranged on that side of the reinforcement beam member where the distance between the edges of the two adjacent and inclined transversal wall elements is less. This means that the wider ends of the wedge-like openings mentioned above are still open; instead the more narrow ends of the wedge-like openings are closed by the second type of transversal wall elements.

In an embodiment the reinforcement beam members are fixed to the housing beam member by means of adhesives. Other fixing means may, however, be used.

In an embodiment the device comprises first and second longitudinally spaced-apart bracket arrangements for mounting the beam to the vehicle.

In an embodiment each of the first and second bracket arrangements comprises a front and a rear mounting points for connection to corresponding support points, respectively, arranged on the vehicle, wherein the rear mounting point is connected to the beam by means of first and second crash tubes that are inclined in relation to each other and that also are inclined in relation to the inner panel of the housing beam member so that, when the front underrun protection device is mounted to the vehicle, the rear mounting point will be located above the beam. This provides for an advantageous load distribution during impact.

In an embodiment the first crash tube extends, as projected to a horizontal plane, in a direction substantially perpendicular to the longitudinal direction of the beam.

In an embodiment the second crash tube connects to the beam at a position that is closer to an end of the beam than to a position at the beam where the first crash tube connects.

In an embodiment the housing beam member, the first and second reinforcement beam members, and the plurality of wall elements are made of a plastic or polymeric material.

The invention also relates to a vehicle comprising a front underrun protection device according to above.

In an embodiment of the vehicle, the front underrun protection device is arranged so that the inner panel of the housing beam member extends in a substantially horizontal plane and so that the first and second reinforcement beam members form upper and lower beam members.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
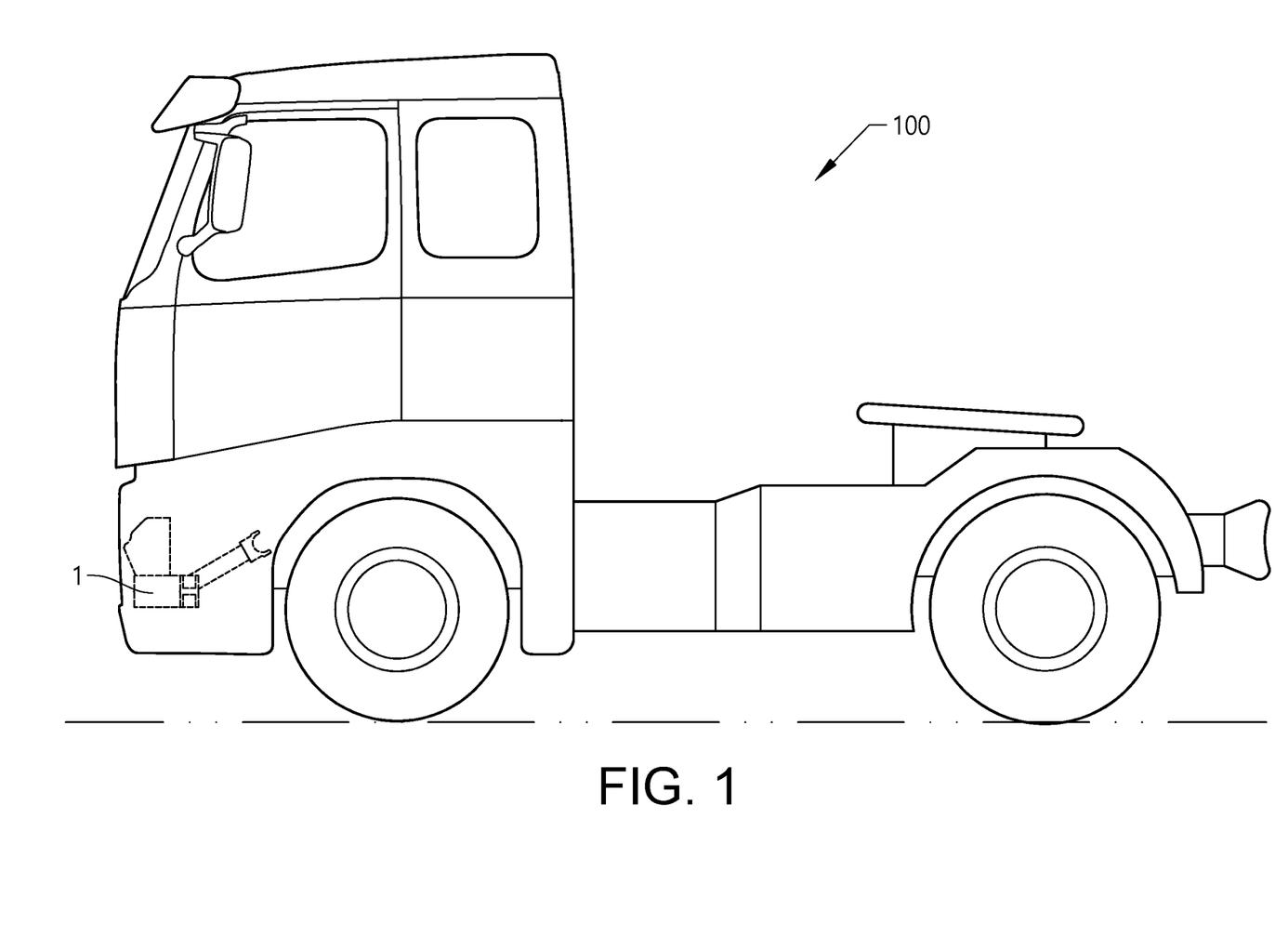
FIG. 1 shows a truck provided with a front underrun protection device.

FIG. 1 shows a truck 100 provided with a front underrun protection device 1. As shown in FIG. 1 the device 1 is arranged in a lower front position of the truck 100.

An embodiment of the front underrun protection device 1 will now be described with reference to FIGS. 2-6.

The front underrun protection device 1 comprises in general a beam 2 and first and second longitudinally spaced-apart bracket arrangements 21, 22 (see FIG. 2) for mounting the beam 2 to the vehicle/truck 100. When the device 1 is arranged onto the vehicle 100 the beam 2 extends from side to side of the vehicle 100 at a lower front position thereof. In this example the beam 2 is entirely made of a plastic/polymeric material in the form of polymerized dicyclopentadiene (DCPD).

Figure 4:
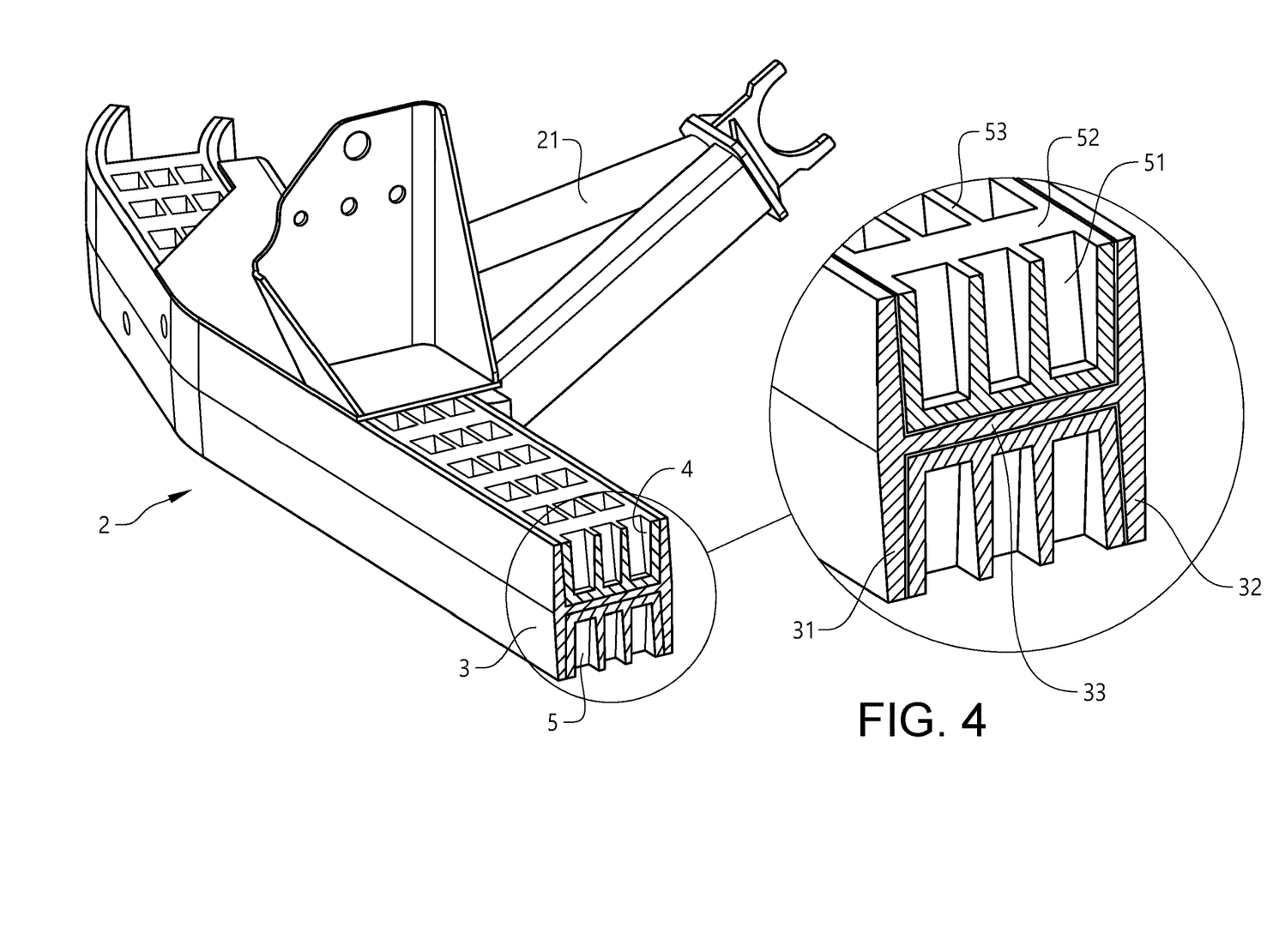
FIG. 4 shows a cross sectional view, with magnification, of the device of FIG. 2.
Figures 5A, 5B:
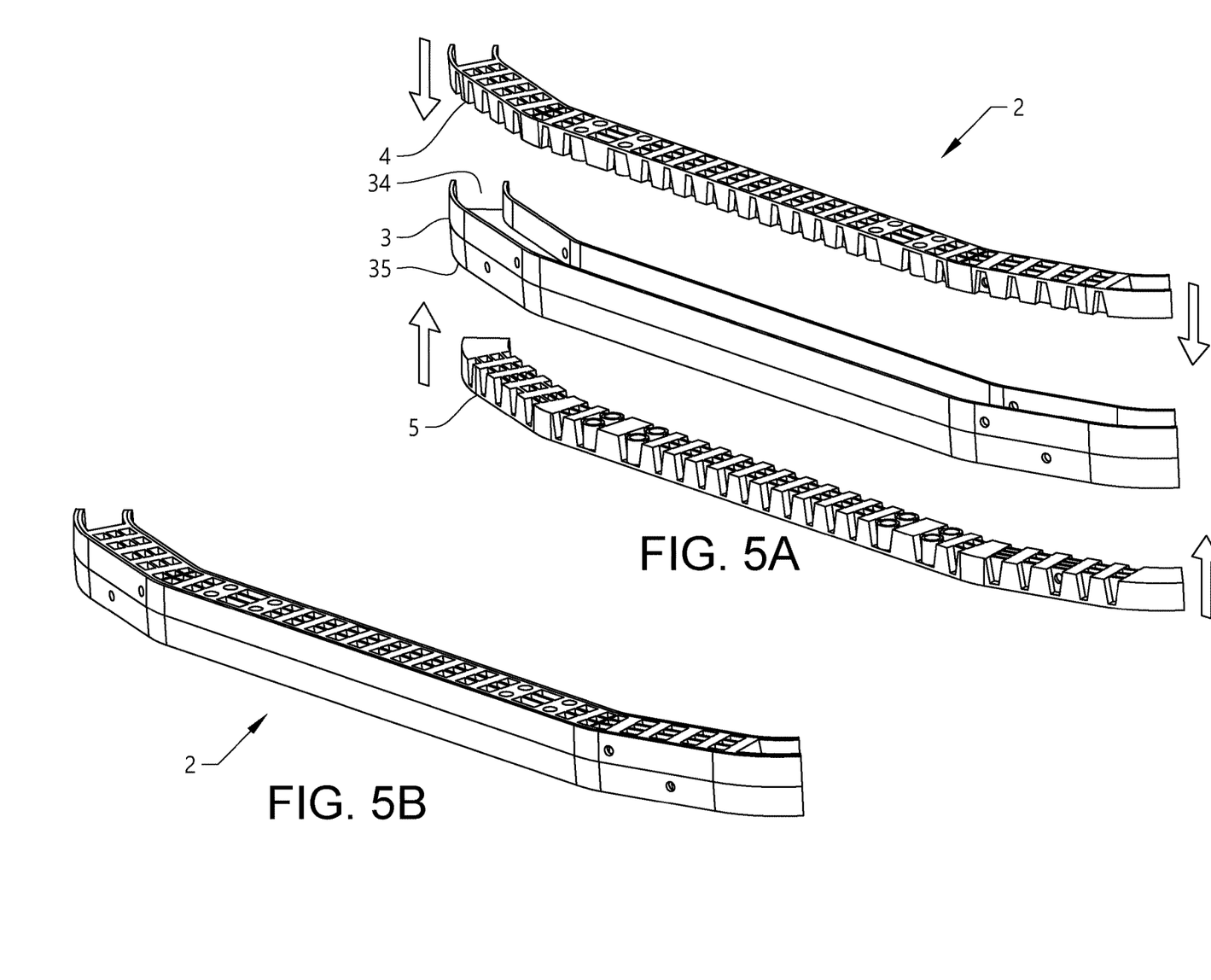
FIG. 5A shows an exploded view of a beam forming part of the device of FIG. 2.
FIG. 5B shows the beam of FIG. 5A in an assembled state.

The beam 2 comprises a housing beam member 3 and first and second reinforcement beam members 4, 5 all extending in a longitudinal direction of the beam 2 (see FIGS. 4-5). The housing beam member 3 has a substantially H-shaped cross-section (see FIG. 4) with first and second substantially parallel outer panels 31, 32 connected by an inner panel 33 that extends between the first and second outer panels 31, 32 in a plane substantially perpendicular to that of each of the outer panels 31, 32 so as to form first and second channels 34, 35 extending along the housing beam member 3 at opposite sides of the inner panel 33.

The first and second reinforcement beam members 4, 5 have a similar structure but are oriented differently.

When the front underrun protection device 1 is arranged onto the vehicle 100, as in FIG. 1, the inner panel 33 of the housing beam member 3 extends in a substantially horizontal plane and the first and second reinforcement beam members 4, 5 form upper and lower 35 beam members.

Figure 6A:
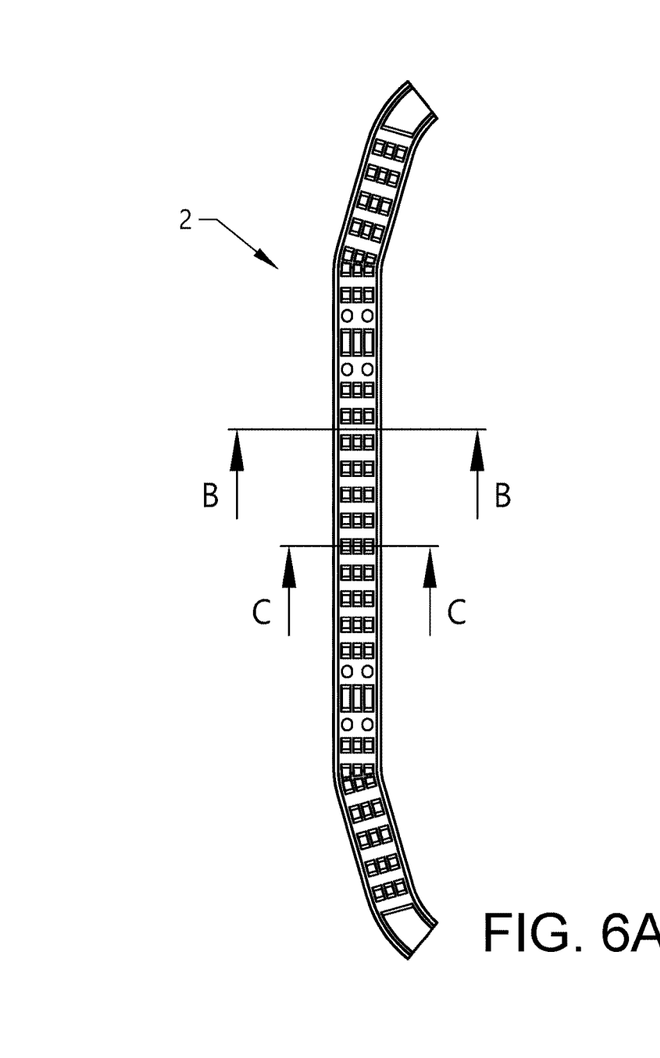
FIGS. 6A-6C show cross sections of the beam.
Figure 6B:
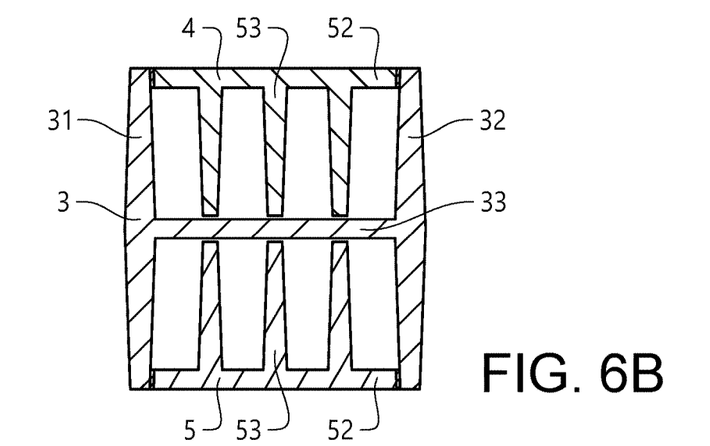
Figure 6C:
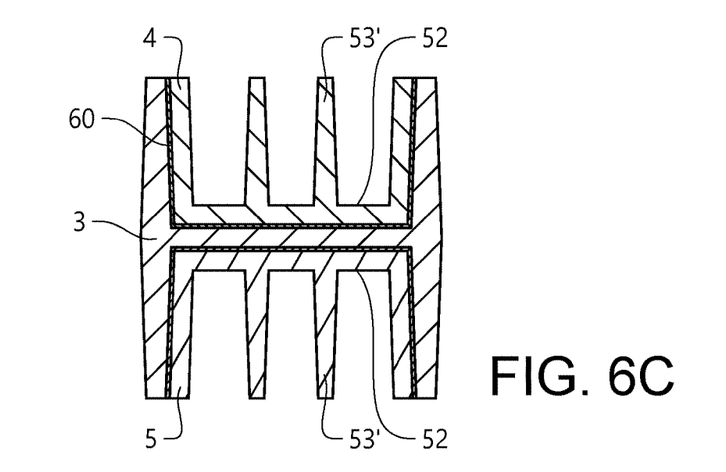

Each of the first and second reinforcement beam members 4, 5 has an outer shape adapted to fit into the first and second channel 34, 35, respectively, of the housing beam member 3. Further, each of the first and second reinforcement beam members 4, 5 is arranged in its corresponding channel 34, 35 and arranged to extend along the housing beam member 3. As indicated in FIGS. 6B and 6C, the reinforcement beam members 4, 5 are fixed to surfaces of the channels 34, 35 of the housing beam member 3 by means of adhesives 60.

Each of the first and second reinforcement beam members 4, 5 is provided with a plurality of wall elements comprising transversal wall elements 51, 52 distributed along and extending across the reinforcement beam member 4, 5 and longitudinal wall elements 53, 53' extending in a longitudinal direction of the reinforcement beam member 4, 5 between the transversal wall elements 51.

The transversal wall elements 51, 52 comprise a first type of transversal wall elements 51 that extend in a plane of the beam 2 that is perpendicular or mainly perpendicular to the inner panel 33 of the housing beam member 3. In this example, all the transversal wall elements of the first type 51 are somewhat inclined in relation to the inner panel 33 of the housing beam member 3. This can be seen in FIG. 4. Further, adjacent inclined transversal wall elements of the first type 51 are inclined in different or opposite directions so that a certain pair of adjacent wall elements 51 are inclined either towards each other or away from each other.

With reference to FIG. 4 it can be seen that the transversal wall element of the first type that forms part of the first (upper) reinforcement beam member 4 and that is clearly shown in the magnified part of FIG. 4 is inclined in a direction so that its upper part is located further away (further down through the plane of FIG. 4) than its lower part. An adjacent wall element of the first type 51 located beyond the clearly visible wall element 51 (but hidden under/behind the wall structure 52) is inclined in an opposite direction, i.e. that (hidden) adjacent wall element leans towards the clearly visible wall element 51.

The transversal wall elements comprise also a second type of transversal wall elements 52 that extend in a plane of the beam 2 that is substantially parallel with the inner panel 33 of the housing beam member 3 (see FIGS. 4 and 6B). The wall element 52 (see magnified part of FIG. 4) is an example of a transversal wall element of the second type.

As shown or at least indicated in the magnified view of FIG. 4, the transversal wall elements of the second type 52 are arranged to connect end portions or edges of pairs of adjacent and inclined transversal wall elements of the first type 51.

The longitudinal wall elements 53, 53' extend in a plane of the beam 2 that is substantially perpendicular to the inner panel 33 of the housing beam member 3.

FIG. 5A provides an overview of the complete structure of each of the reinforcement beam members 4, 5 since the two members 4, 5 are similar (but oriented differently), since FIG. 5A shows the upper side of the first reinforcement member 4 and since the not shown lower side of the first reinforcement member 4 corresponds to the upper side of the second reinforcement member 5, which is shown in FIG. 5A.

Each reinforcement beam member 4, 5 comprises a large number of transversal wall elements of the first type 51, i.e. the more or less vertically arranged transversal wall elements. This means that each reinforcement beam member 4, 5 comprises a first, a second and a third adjacent transversal wall element of the first type 51, wherein the first and third transversal wall elements are arranged on opposite sides of the second transversal wall element in the longitudinal direction of the beam 2. Further, one or more longitudinal wall elements 53 extend between the first and the second transversal wall elements and one or more further longitudinal wall elements 53' extend between the second and the third transversal wall elements. The one or more longitudinal wall elements 53 that extend between the first and the second transversal wall elements (in this example three longitudinal wall elements 53, see FIG. 6B) are arranged transversally offset in relation to the one or more further longitudinal wall elements that extend between the second and the third transversal wall elements (in this example two (central) longitudinal wall elements 53', see FIG. 6C).

The longitudinal distance between the first and the second transversal wall element forms a first type of section, wherein the longitudinal distance between the second and the third transversal wall element forms a second type of section, wherein each reinforcement beam member 4, 5 in the longitudinal direction thereof comprises a repetitive pattern of sections where a plurality of first and second sections are arranged adjacent each other in alternating order.

The above concerning first, second and third transversal wall elements of the first type 51, different sections, etc., can be explained with reference to FIGS. 6A-6C. FIG. 6A indicates positions for cross sections A and B, which are shown in FIGS. 6B and 6C, respectively. As can be seen from several of the figures, each reinforcement beam member 4, 5 are made up of, at least over a portion of its length, a repetitive pattern of two types of sections. Each section extends between two adjacent transversal wall elements of the first (vertical) type 51. Cross section B is taken through a first type of section and cross section C is taken through a second type of section. In FIG. 6A the cross sections B and C are located at some distance from each other but since there is a repetitive pattern of the first and second type of sections, cross sections of adjacent sections has the same structure as shown in FIGS. 6B and 6C.

Thus, in the first type of section (FIG. 6B) there are three longitudinal wall elements 53, which are connected to and covered on an outside by a transversal wall element of the second type 52, and in an adjacent second type of section (FIG. 6C) there are two longitudinal wall elements 53' (besides the outer sides of the reinforcement beam member 4, 5) arranged transversally offset in relation to the three longitudinal wall elements 53 of the first type of section. This offset feature can be clearly seen by comparing FIGS. 6B and 6C. In the second type of section (FIG. 6C) the transversal wall element of the second type 52 connects the longitudinal wall elements 53' on an inside of the reinforcement beam members 4, 5, i.e. close to inner panel 33 of the housing beam member 3.

For a certain pair of adjacent and inclined transversal wall elements of the first type 51 where the distance between the edges of the two wall elements 51 in the pair is (because of the inclination) less on one side of the reinforcement beam member 4, 5 than on the opposite side, the corresponding transversal wall element of the second type 52 is arranged on that side of the reinforcement beam member 4, 5 where the distance between the edges of the two adjacent and inclined transversal wall elements 51 is less. This is another way of saying that the transversal wall element of the second type 52 is arranged on one side of the reinforcement beam member 4, 5 for the first type of section and on the opposite side for the second type od section (see FIGS. 6B and 6C). The pattern of alternating sections and alternating sides for the position of the transversal wall element of the second (horizontal) type 52 can be seen from e.g. FIGS. 5A and 6A-6C.

Figure 2:
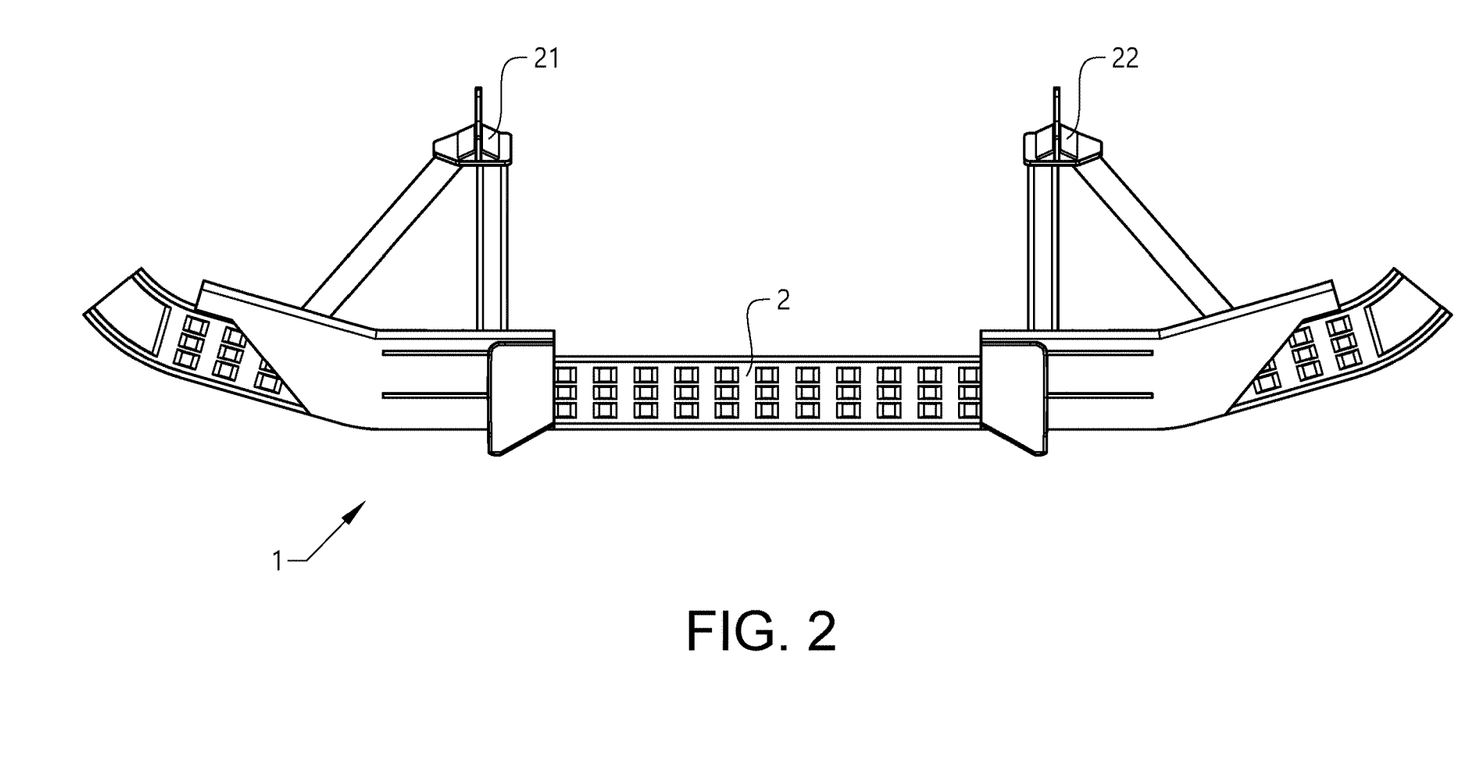
FIG. 2 shows a top view of an embodiment of a front underrun protection device according to the invention.
Figure 3:
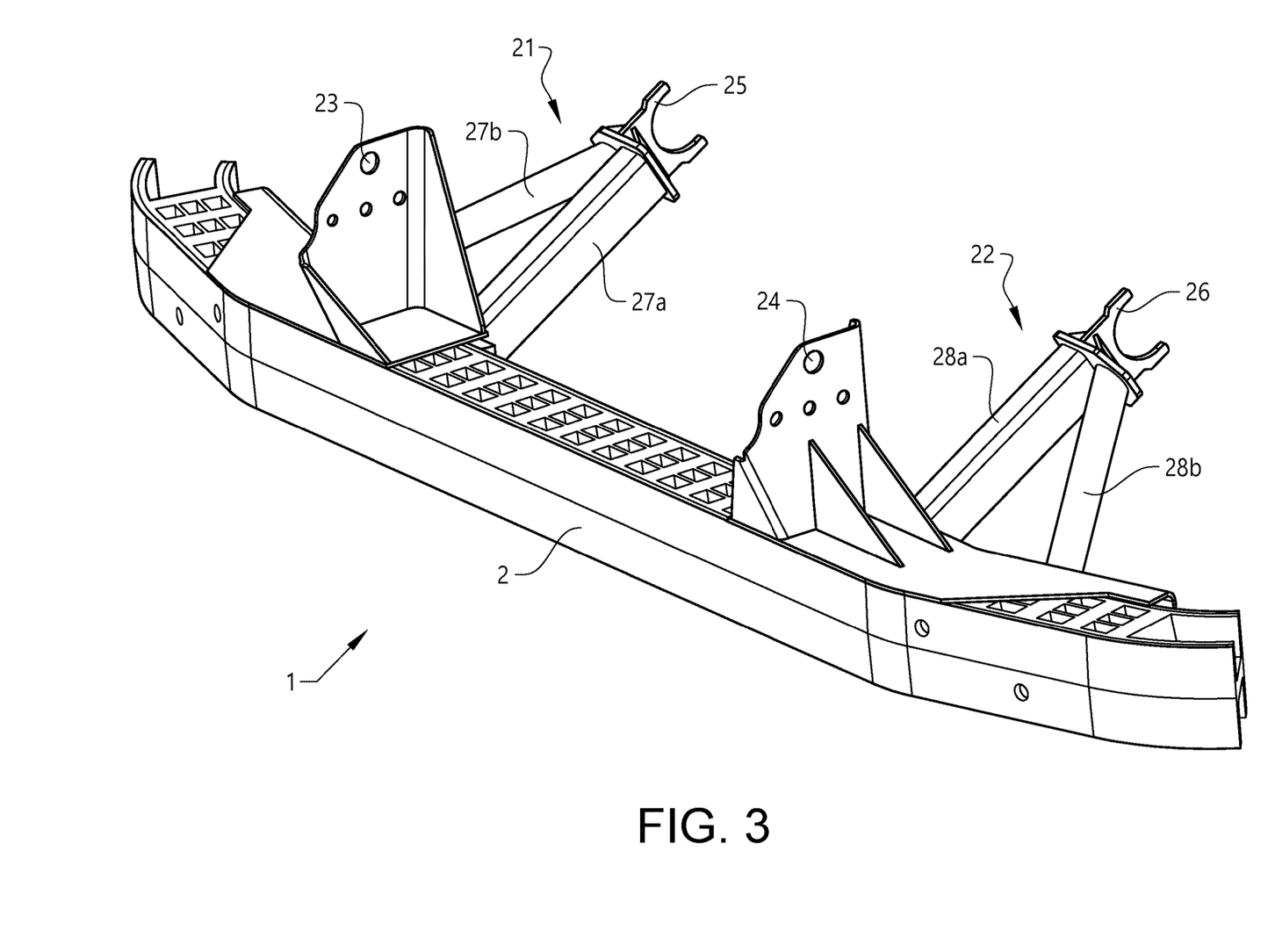
FIG. 3 shows a perspective view of the device of FIG. 2.

As shown in FIGS. 2-3, each of the first and second bracket arrangements 21, 22 comprises a front 23, 24 and a rear 25, 26 mounting point for connection to corresponding support points, respectively, arranged on the vehicle 100, wherein the rear mounting point 25, 26 is connected to the beam 2 by means of first and second crash tubes 27a, 27b, 28a, 28b that are inclined in relation to each other and that also are inclined in relation to the inner panel 33 of the housing beam member 3 so that, when the front underrun protection device 1 is mounted to the vehicle 100, the rear mounting point 25, 26 will be located above the beam 2.

Moreover, the first crash tube 27a, 28a extends, as projected to a horizontal plane, in a direction substantially perpendicular to the longitudinal direction of the beam 2.

The second crash tube 27b, 28b connects to the beam 2 at a position that is closer to an end of the beam 2 than a position at the beam 2 where the first crash tube 27a, 28a connects to.

The housing beam member 3, the first and second reinforcement beam members 4, 5 and the plurality of wall elements 51, 52, 53, 53', which form an integrated part together with the corresponding reinforcement beam member, are all made of a plastic or polymeric material.

The bracket arrangements 21, 22 can be made of metal, such as aluminium or steel, or can be made of a combination of different materials.

Examples of typical dimensions for parts of the front underrun protection device 1 include:

Length of beam 2: 2200 mm (the width of the vehicle 100 may be around 2500 mm);

Width of beam 2 (width of housing beam member 3): 120 mm;

Height of beam 2 (height of housing beam member 3): 132 mm;

Width of reinforcement beam member 4, 5: 100 mm (corresponding to width of channels 34, 35 in housing beam member 3);

Height of reinforcement beam member 4, 5: 60 mm; and

Thickness of wall elements 51, 52, 53, 53': 8 mm.

It is to be understood that the present invention is not limited to the embodiments described above and illustrated in the drawings; rather, the skilled person will recognize that many changes and modifications may be made within the scope of the appended claims. For instance, the exact structure of the wall elements may be varied. Further, other plastic/polymeric materials than DCPD may be used. As an example, a stiffer material, such as nylon, may be used for the reinforcement beam members.

The invention claimed is:

1. A front underrun protection device for a heavy vehicle, comprising:
a beam configured to extend from side to side of the heavy vehicle at a lower front position thereof and to absorb collision energy, the beam at least partly made of a plastic or polymeric material, the beam comprising:
a housing beam member extending in a longitudinal direction and having a substantially H-shaped cross-section with first and second substantially parallel outer panels connected by an inner panel that extends between the first and second outer panels in a plane substantially perpendicular to that of the outer panels so as to form first and second channels extending between the outer panels along the housing beam member at opposite sides of the inner panel, wherein a portion of the housing beam member further has a cross-section comprising a substantially U-shaped part as part of one of the first channel or the second channel, and
at least one reinforcement beam member arranged in at least one of the first and second channels and extending along the housing beam member, the at least one reinforcement beam member provided with a plurality of wall elements comprising:
transversal wall elements distributed along and extending across the at least one reinforcement beam member, and
longitudinal wall elements extending in a longitudinal direction of the at least one reinforcement beam member between the transversal wall elements, and
wherein the housing beam member is arranged so that the inner panel of the housing beam member extends in a substantially horizontal plane and so that the at least one reinforcement beam member forms an upper or a lower beam member.

2. The front underrun protection device of claim 1, wherein:
the at least one reinforcement beam member comprises first and second reinforcement beam members, each having an outer shape adapted to fit into the first and second channels, respectively, of the housing beam member,
each of the first and second reinforcement beam members is arranged in its corresponding channel and arranged to extend along the housing beam member, and
each of the first and second reinforcement beam members is provided with the plurality of wall elements.

3. The front underrun protection device of claim 1, wherein the transversal wall elements comprise at least a first type of transversal wall elements that extend in a plane of the beam that is perpendicular or mainly perpendicular to the inner panel of the housing beam member.

4. The front underrun protection device of claim 1, wherein the longitudinal wall elements extend in a plane of the beam that is substantially perpendicular to the inner panel of the housing beam member.

5. The front underrun protection device of claim 3, wherein:
the at least one reinforcement beam member comprises at least a first, a second and a third transversal wall element of the first type,
the first and third transversal wall elements are arranged on opposite sides of the second transversal wall element in the longitudinal direction of the beam,
one or more longitudinal wall elements extend between the first and the second transversal wall elements, wherein one or more further longitudinal wall elements extend between the second and the third transversal wall elements, and wherein the one or more longitudinal wall elements that extend between the first and the second transversal wall elements are arranged transversally offset in relation to the one or more further longitudinal wall elements that extend between the second and the third transversal wall elements.

6. The front underrun protection device of claim 5, wherein:
the longitudinal distance between the first and the second transversal wall element forms a first type of section,
the longitudinal distance between the second and the third transversal wall element forms a second type of section,
the at least one reinforcement beam member comprises, at least over a portion thereof, a repetitive pattern of sections where a plurality of first and second sections are arranged adjacent each other in alternating order.

7. The front underrun protection device of claim 3, wherein at least a portion of the transversal wall elements of the first type are inclined in relation to the inner panel of the housing beam member.

8. The front underrun protection device of claim 7, wherein adjacent inclined transversal wall elements are inclined in different directions so that a certain pair of adjacent wall elements are inclined either towards each other or away from each other.

9. The front underrun protection device of claim 1, wherein the transversal wall elements comprise a second type of transversal wall elements that extend in a plane of the beam that is substantially parallel with the inner panel of the housing beam member.

10. The front underrun protection device of claim 8, wherein the transversal wall elements of the second type are arranged to connect end portions or edges of pairs of adjacent and inclined transversal wall elements of the first type.

11. The front underrun protection device of claim 10, wherein, for a certain pair of adjacent and inclined transversal wall elements of the first type where the distance between the edges of the two wall elements in the pair is, because of the inclination, less on one side of the at least one reinforcement beam member than on the opposite side, the corresponding transversal wall element of the second type is arranged on that side of the at least one reinforcement beam member where the distance between the edges of the two adjacent and inclined transversal wall elements is less.

12. The front underrun protection device of claim 1, wherein the at least one reinforcement beam member is fixed to the housing beam member by adhesives.

13. The front underrun protection device of claim 1, wherein the front underrun protection device comprises first and second longitudinally spaced-apart bracket arrangements for mounting the beam to the vehicle.

14. The front underrun protection device of claim 13, wherein each of the first and second bracket arrangements comprises a front and a rear mounting point for connection to corresponding support points, respectively, arranged on the heavy vehicle,
wherein the rear mounting point is connected to the beam by first and second crash tubes that are inclined in relation to each other and that also are inclined in relation to the inner panel of the housing beam member so that, when the front underrun protection device is mounted to the heavy vehicle, the rear mounting point will be located above the beam.

15. The front underrun protection device of claim 14, wherein the first crash tube extends, as projected in a horizontal plane, in a direction substantially perpendicular to the longitudinal direction of the beam.

16. The front underrun protection device of claim 14, wherein the second crash tube connects to the beam at a position that is closer to an end of the beam than to a position at the beam where the first crash tube connects.

17. The front underrun protection device of claim 1, wherein the housing beam member, the at least one reinforcement beam member, and the plurality of wall elements are made of a plastic or polymeric material.

18. A vehicle comprising:
a front underrun protection device, comprising:
a beam configured to extend from side to side of the vehicle at a lower front position thereof and to absorb collision energy, the beam at least partly made of a plastic or polymeric material the beam comprising:
a housing beam member extending in a longitudinal direction and having a substantially H-shaped cross-section with first and second substantially parallel outer panels connected by an inner panel that extends between the first and second outer panels in a plane substantially perpendicular to that of the outer panels so as to form first and second channels extending between the outer panels along the housing beam member at opposite sides of the inner panel, wherein a portion of the housing beam member further has a cross-section comprising a substantially U-shaped part as part of one of the first channel or the second channel, and
at least one reinforcement beam member arranged in at least one of the first and second channels and extending along the housing beam member, the at least one reinforcement beam member is provided with a plurality of wall elements comprising:
transversal wall elements distributed along and extending across the at least one reinforcement beam member, and
longitudinal wall elements extending in a longitudinal direction of the at least one reinforcement beam member between the transversal wall elements, and
wherein the front underrun protection device is arranged so that the inner panel of the housing beam member extends in a substantially horizontal plane and so that the at least one reinforcement beam member forms an upper or a lower beam member.

19. A front underrun protection device for a heavy vehicle, comprising:
a beam configured to extend from side to side of the heavy vehicle at a lower front position thereof and to absorb collision energy, the beam at least partly made of a plastic or polymeric material, the beam comprising:
a housing beam member extending in a longitudinal direction and having a substantially H-shaped cross-section with first and second substantially parallel outer panels connected by an inner panel that extends between the first and second outer panels in a plane substantially perpendicular to that of the outer panels so as to form first and second channels extending between the outer panels along the housing beam member at opposite sides of the inner panel, wherein a portion of the housing beam member further has a cross-section comprising a substantially U-shaped part as part of one of the first channel or the second channel, and
at least one reinforcement beam member arranged in at least one of the first and second channels and extending along the housing beam member, the at least one reinforcement beam member provided with a plurality of wall elements comprising:
transversal wall elements distributed along and extending across the at least one reinforcement beam member, and
longitudinal wall elements extending in a longitudinal direction of the at least one reinforcement beam member between the transversal wall elements, and
wherein the housing beam member, the at least one reinforcement beam member, and the plurality of wall elements are made of a plastic or polymeric material.

* * * * *